(12) United States Patent
Coulon et al.

(10) Patent No.: US 11,128,146 B2
(45) Date of Patent: Sep. 21, 2021

(54) ELECTRICAL SUBSTATION, INSTALLATION AND METHOD OF IMPLEMENTION

(71) Applicant: CHANTIERS DE L'ATLANTIQUE, Saint Nazaire (FR)

(72) Inventors: Eric Coulon, Saint Michel Chef Chef (FR); James Gazeau, Chaumes en Retz (FR); Antoine Simard, Camoel (FR)

(73) Assignee: Chantiers De L'Atlantique, Saint Nazaire (FR)

( * ) Notice: Subject to any disclaimer, the term of this patent is extended or adjusted under 35 U.S.C. 154(b) by 40 days.

(21) Appl. No.: 16/619,324

(22) PCT Filed: Jun. 4, 2018

(86) PCT No.: PCT/EP2018/064597
§ 371 (c)(1),
(2) Date: Dec. 4, 2019

(87) PCT Pub. No.: WO2018/224430
PCT Pub. Date: Dec. 13, 2018

(65) Prior Publication Data
US 2020/0106274 A1 Apr. 2, 2020

(30) Foreign Application Priority Data

Jun. 6, 2017 (FR) ...................................... 1755010

(51) Int. Cl.
*H02J 3/46* (2006.01)
*F03D 9/25* (2016.01)
(Continued)

(52) U.S. Cl.
CPC .............. *H02J 3/472* (2020.01); *F03D 7/048* (2013.01); *F03D 9/257* (2017.02); *F05B 2270/337* (2013.01); *H02B 5/00* (2013.01)

(58) Field of Classification Search
CPC . F03D 7/048; F03D 9/257; H02B 5/00; Y02E 10/76; Y02E 10/72; H02J 3/381;
(Continued)

(56) References Cited

U.S. PATENT DOCUMENTS 3,996,717 A 12/1976 Sallenave et al.
6,338,228 B1 1/2002 Chevalier
(Continued)

FOREIGN PATENT DOCUMENTS

CN 203942186 U 11/2014
CN 204126320 U * 1/2015 ............. F03D 13/25
(Continued)

OTHER PUBLICATIONS

"The TW 2.0 Offshore Technical Description", Sustain. The World Sustainable Energy Fair, XX, XX, May 15, 1999, pp. 1-36, XP001059295.

*Primary Examiner* — Charles Reid, Jr.
(74) *Attorney, Agent, or Firm* — Harness, Dickey & Pierce, PLC.

(57) ABSTRACT

An electrical substation for a wind farm is configured to raise or to lower the voltage of the electricity generated by wind turbines of the wind farm in order to ensure the transmission thereof to an electricity distribution network. It includes n modules, n being an integer at least equal to 2, these modules being identical in terms of shape and exterior dimensions. Each module encloses at least one electrical transformer configured to raise or to lower the voltage, these modules being linked to one another so as to be able to deliver to the network an overall electrical power equal to the sum of the powers of each transformer.

16 Claims, 10 Drawing Sheets

(51) Int. Cl.
  *F03D 7/04* (2006.01)
  *H02B 5/00* (2006.01)

(58) Field of Classification Search
  CPC ........ H02J 3/472; H02J 2300/28; H02J 3/386;
          E04H 5/04; F05B 2270/337
  USPC ..................................................... 290/44, 55
  See application file for complete search history.

(56) References Cited

U.S. PATENT DOCUMENTS

| | | | |
|---|---|---|---|
| 7,156,031 | B2 | 1/2007 | Mermier et al. |
| 9,627,865 | B2* | 4/2017 | van Dyk ............... H02B 13/025 |
| 2003/0075090 | A1 | 4/2003 | Mermier et al. |
| 2007/0022932 | A1 | 2/2007 | Mermier et al. |
| 2011/0106321 | A1* | 5/2011 | Cherian ............ H02J 13/00002 |
| | | | 700/286 |
| 2012/0029897 | A1* | 2/2012 | Cherian ................... H02J 13/00 |
| | | | 703/18 |
| 2013/0001946 | A1* | 1/2013 | Nielsen ................... H02J 3/386 |
| | | | 290/44 |
| 2013/0197704 | A1* | 8/2013 | Pan ......................... H02J 3/381 |
| | | | 700/287 |
| 2013/0200714 | A1* | 8/2013 | Pan ......................... H02J 1/102 |
| | | | 307/82 |
| 2015/0263569 | A1* | 9/2015 | Brogan ..................... F03D 9/11 |
| | | | 290/44 |
| 2016/0036221 | A1* | 2/2016 | Pan ......................... H02J 3/381 |
| | | | 307/52 |

FOREIGN PATENT DOCUMENTS

| | | |
|---|---|---|
| CN | 204456043 U | 7/2015 |
| CN | 104631410 B | 5/2016 |
| GB | 253217 A | 6/1926 |
| WO | WO-2011120591 A1 | 10/2011 |
| WO | WO-2012144884 A1 | 10/2012 |

* cited by examiner

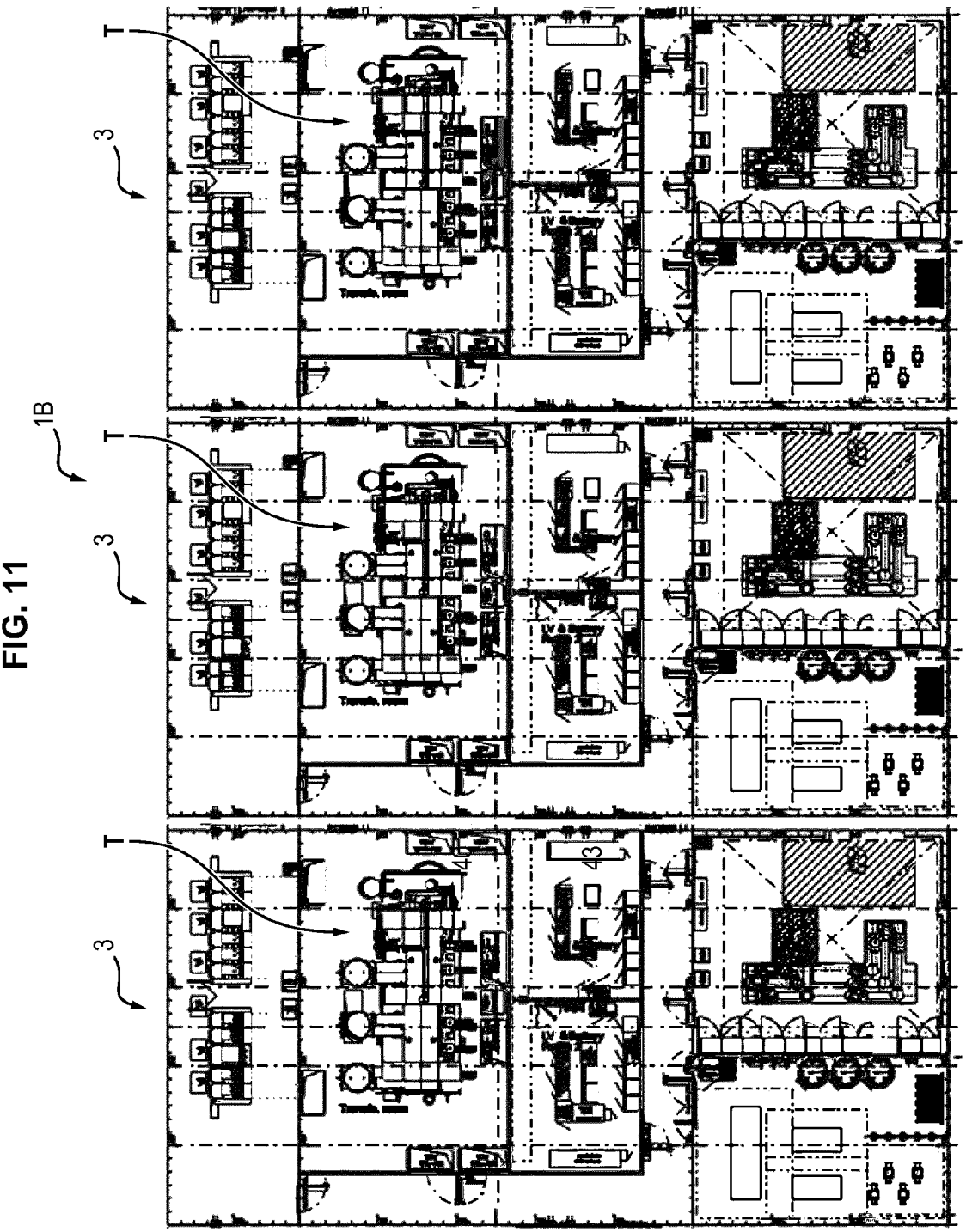

ELECTRICAL SUBSTATION, INSTALLATION AND METHOD OF IMPLEMENTION

CROSS-REFERENCE TO RELATED APPLICATIONS

This application is a National Phase Entry of International Patent Application No. PCT/EP2018/064597, filed on Jun. 4, 2018, which claims priority to French Patent Application Serial No. 1755010, filed on Jun. 6, 2017, both of which are incorporated by reference herein.

TECHNICAL FIELD

The present invention relates in particular to an electrical sub-station for a wind farm, which is configured to raise or lower the voltage of the electricity produced by wind turbines and to allow its conveyance with minimum loss to a distribution grid. The invention applies advantageously to the onshore or offshore energy production. The field of offshore applications will be more particularly detailed below.

BACKGROUND

An offshore wind farm consists of a variable number of wind turbines. The unit power of these wind turbines is also variable. This is often referred to as total power of the wind farm which is expressed in Megawatts (MW) and whose range varies commonly from 200 MW to 900 MW.

For the electric voltage to be conveyed with optimal performance (reduction of losses between departure and arrival), it is necessary to raise it (33 kV/220 kV for example). A transformer station or electrical sub-station ("OSS" for "Offshore Sub-Station") is therefore necessary. It consists mainly of at least one transformer and all equipment items necessary for its proper operation, maintenance, control, safety, grid-connection and access on board.

The current period called "energy transition" is characterized essentially by the fact that there is a tendency to produce more and more electricity from renewable sources (wind, current, tide, sun, . . . ), in replacement of fossil and/or polluting sources (oil, coal, nuclear power). This energy transition will be possible only if robust industrial solutions are available on the market and allow being competitive with current energies. Thus, the cost of energies therebetween is compared by the LCOE ("Levelized Cost of Energy"), in €/kWh. The market is therefore expecting a significant decrease in the cost of energy from the offshore wind power.

A Sub-station generally includes a usually "mechanically welded"-type structure, electrical equipment items (switchboards known under the acronym "GIS", transformers, . . . ), lifting, firefighting, energy production equipment items for its own additional needs (operation of a crane, etc.) and secondary-structure elements (stairs, ladders, etc.).

The field of the offshore wind power is characterized mainly by:
  the use of very powerful turbines (power>5 MW) generating more and more significant powers;
  a very large number of wind turbines (>50 wind turbines);
  substantial resources for offshore transportation and installation;
  very severe environmental conditions (soil, swell, current, wind, etc.);
  more stringent regulatory requirements than in the terrestrial field (fatigue strength, safety, . . . );
  very demanding conditions of use (difficulty of maintenance, access, handling, . . . ).

The current practice of sub-station construction consists of designing electrical sub-stations specific to each customer and each site to equip. Thus, each sub-station has its own characteristics in terms of architecture, power, mass and dimensions. Each newly built sub-station is therefore, somehow, a "prototype".

To design such assemblies and while seeking to reduce the costs, those skilled in the art can rely on document GB 253 217. This document proposes to achieve gains by "integrating" the sub-station on a wind turbine foundation, thereby removing the additional foundation on which the sub-station is based. However, this solution has limits in particular in terms of mass. It is indeed difficult to add to a foundation already subject to significant forces from the wind turbine, additional equipment that generates additional forces. To reduce these forces, those skilled in the art will have to inevitably limit the electrical equipment items or significantly strengthen the foundation of the wind turbine.

This necessarily limits the cases of use of such solution and at best would significantly increase the number of equipment items that will need to be added to the wind turbine foundations. It is then possible to question the advantage of this solution for those skilled in the art. The state of the art in this field can also be illustrated by documents: WO 2011/120591, WO 2012/144884, CN 204 126 320, CN 104 631 410, CN 203 942 186, CN 204 456 043 and "THE TW 2.0 OFFSHORE TECHNICAL DESCRIPTION", SUSTAIN, THE WORLD SUSTAINABLE ENERGY FAIR (1999 Sep. 15).

The present invention aims at providing a solution to this problem by rationalizing the construction of the electrical sub-stations by reducing their overall cost, without any impact in terms of equipment items usually contained in such a sub-station, as well as in terms of safety and maintenance parameters in particular.

SUMMARY

Thus, the present invention relates mainly to an electrical sub-station for a wind farm, which is configured to raise or lower the voltage of the electricity produced by wind turbines of said wind farm in order to ensure its conveyance to a distribution grid, characterized by the fact that it includes n modules, n being an integer at least equal to 2, these modules having identical shape and external dimensions, each module containing at least one electrical transformer configured to raise or lower said voltage, these modules being connected to each other so as to be able to provide to said grid an overall electrical power equal to the sum of the powers of each transformer. The basic technical idea is to propose an electrical sub-station composed of n standardized unit modules. Each standardized unit module is designed to withstand different loads it will encounter during its life phases (on site in operation, during transportation, during installation, taking into account the most unfavorable situations thereby allowing its prior certification).

Advantageously, the module receives all types of equipment items and associated auxiliaries and is designed to be manufactured in a mass production process. The result is a sub-station that fully responds to current and future customer requirements. According to other advantageous and non-limiting characteristics of this sub-station:
  each module includes an arrangement of several rooms, this arrangement being the same from one module to another;

each module includes an arrangement of several rooms, the arrangements of a first and a second module being reversed so that, when positioned next to each other, all or part of their respective rooms are symmetrical;

each module is also provided with at least one equipment from the following list: a high- or medium-voltage switchgear i.e. a "Gas Insulated Switchgear" (GIS), a low-voltage power supply board, an energy storage system ESS for a backup power supply, an ambient air cooling system, a fire detection and firefighting system, shelter premises;

the power of each transformer is comprised between 150 and 400 MW;

said transformers have an identical power or at least one transformer has a different power from that of the other transformers;

one of said modules is provided with a redundant transformer RT, i.e. configured to be put into service only in case of failure of the transformer T of one of the other modules.

Another aspect of the invention relates to a facility which includes a plurality of wind turbines and at least one sub-station according to one of the previous characteristics. According to particular characteristics of this facility:

said sub-station is installed onshore;

said sub-station is installed offshore;

said sub-station rests on a foundation, on a floating support, or on the seabed;

said sub-station rests on a "jacket"-type foundation or monopile;

the modules of said sub-station are installed on the same support or on at least two supports;

at least one module of said sub-station is installed onshore, while the other module(s) is/are installed offshore.

Finally, a last aspect of the invention relates to a method for setting up, on an offshore site, a sub-station according to any of the characteristics listed above. According to particular characteristics of this method:

said onshore modules are connected and these modules are transported and installed on said site;

each of said modules is transported and installed individually and the connection of these modules is carried out on said site.

BRIEF DESCRIPTION OF THE DRAWINGS

Other characteristics and advantages of the invention will become apparent upon reading the following description of a preferred embodiment of the invention. This description is made with reference to the appended drawings wherein:

FIGS. 10 and 11 are diagrams showing, seen from above, the arrangement of the rooms of a sub-station including two, respectively three modules.

DETAILED DESCRIPTION

As indicated above, the present description is given more particularly in relation to the field of offshore applications, i.e. in which the sub-station according to the invention is located offshore. However, unless otherwise stated, what will be said hereinafter also applies for an application in which the sub-station of the invention is located onshore.

Figure 1:
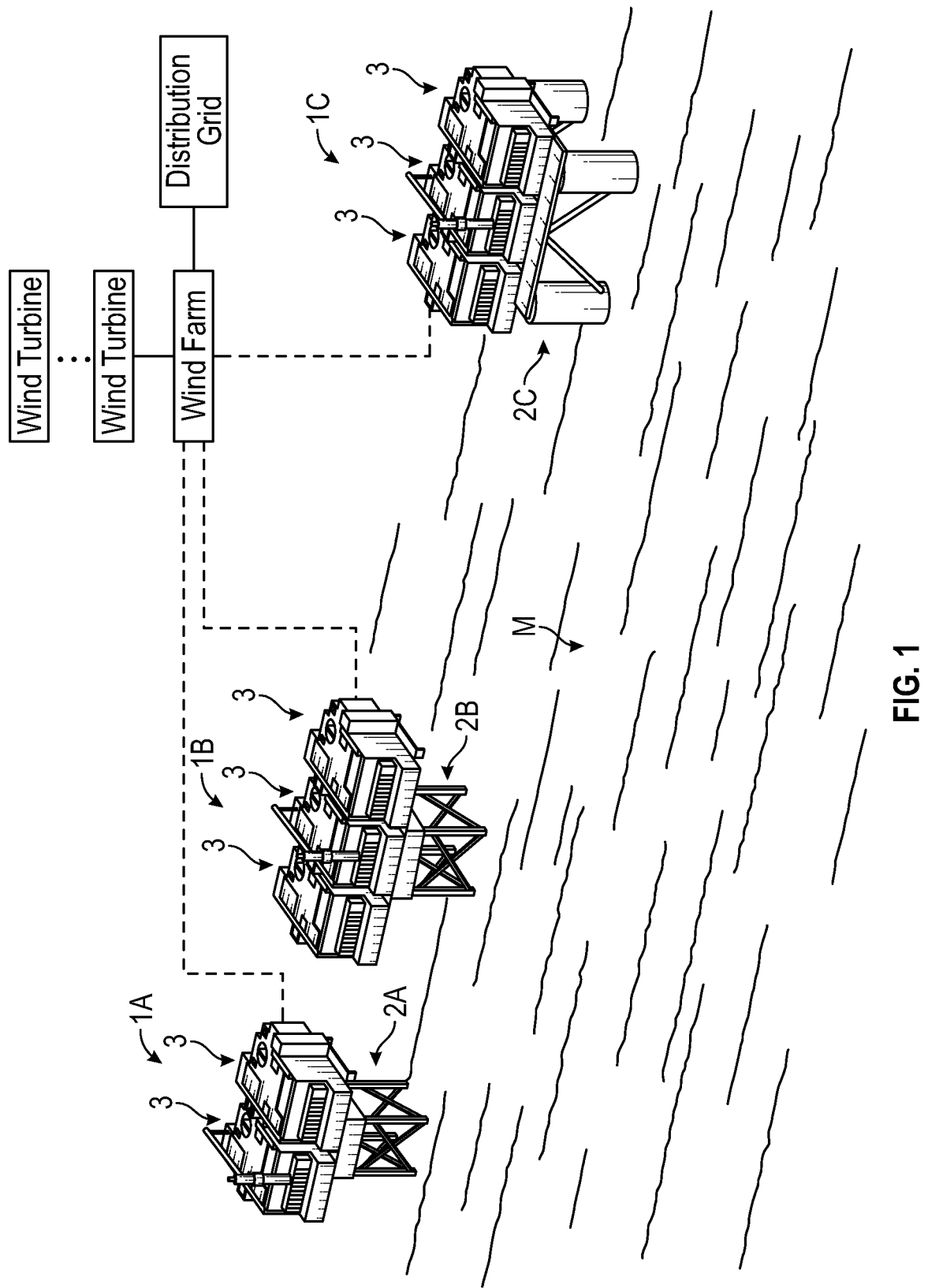
FIG. 1 is a simplified perspective view of three exemplary embodiments of a sub-station according to the invention.

The appended FIG. 1 represents three sub-stations 1A, 1B and 1C according to the present invention. These sub-stations, not represented for a better reading of the figure, are installed offshore and in the vicinity of a wind farm.

The sub-station 1A visible on the left of the figure includes two modules 3 resting on a platform, itself located at the top of a foundation 2A commonly called, in terms of art, "jacket". Usually, the height of this platform is sufficient for the sub-station to be far above sea M level. The term "jacket" is commonly used to designate a "Pylon"-type foundation. It usually consists of a set of four feet that extend upwards, each with a leg having the same oblique orientation forming an acute angle with respect to the vertical, so as to form an assembly resembling the structure of a derrick.

The sub-station 1B, which is visible in the middle of this figure, is of the same type as the previous one, but differs therefrom in that it includes not two but three modules 3 of the same type as those of the sub-station 1A. The foundation 2B is of the same type as the foundation 2A. As for the sub-station 1C which also includes three modules 3, it includes a floating-type foundation 2C provided to be installed in deeper seabed. Those skilled in the art will know how to choose the most appropriate foundation.

In one embodiment not represented, the sub-station can rest directly on the seabed. Of course, the number of modules is not limited to two or three (as in the case of FIG. 1). It can be greater.

Figure 2:
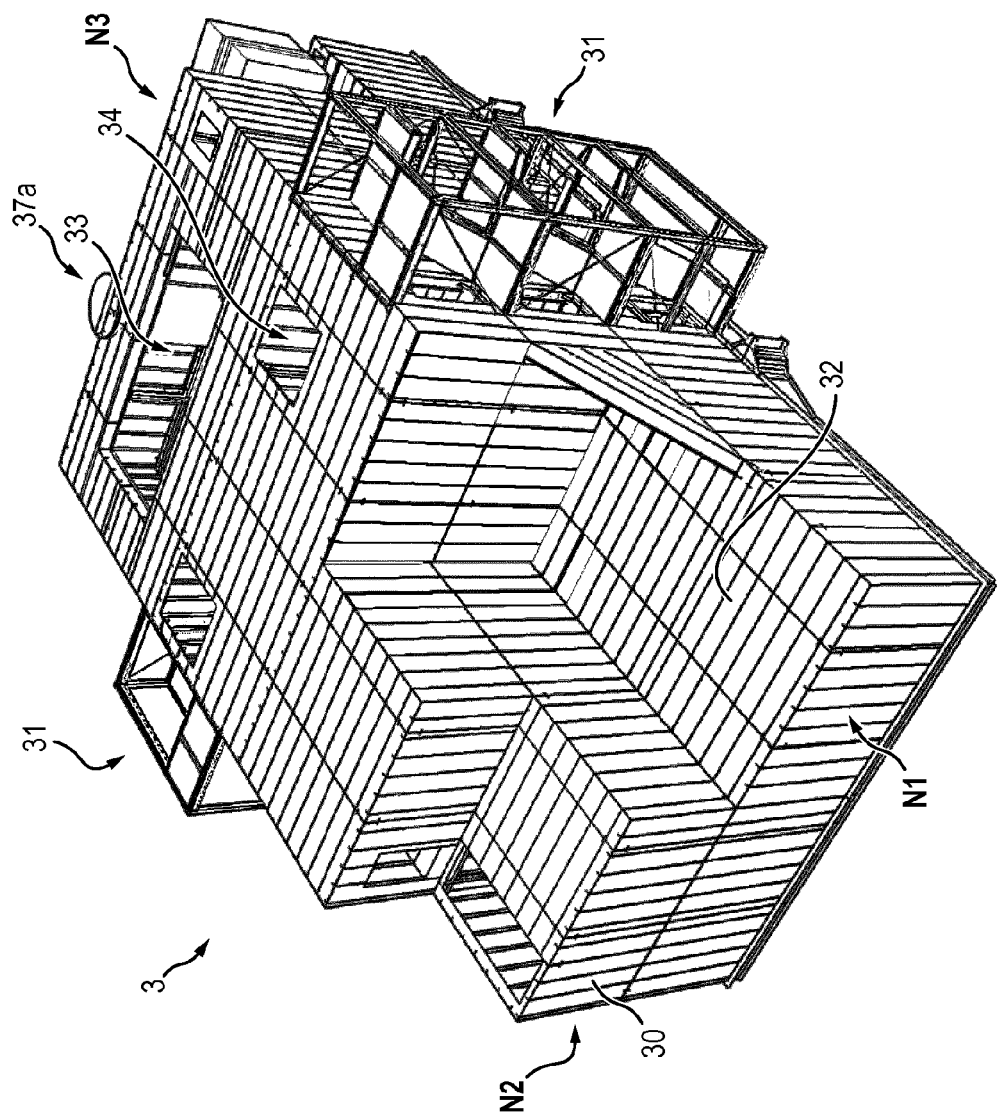
FIG. 2 is a perspective view of one exemplary embodiment of a module which is an integral part of the sub-station of the invention.

FIG. 2 represents a possible exemplary embodiment of a module 3 constituting the sub-station of the invention. Of course, it is a simple exemplary embodiment, so that other forms of modules can be envisaged.

The module represented here fits into a parallelepiped rectangle. It is essentially formed of a metal structure 30 constituted of sheets, stiffeners and profiles. Such a structure is particularly efficient, in particular in terms of rigidity. Here, the module is organized on three levels or floors N1, N2 and N3. Of course, this number can be different (greater or smaller). The internal arrangement of such a module will be specified later in the description.

In FIG. 2, there are two staircases 31 which are placed on either side of the module 3 and which allow the operators to move indifferently from one level to another. In the example represented, the levels N2 and N3 occupy a surface which is lower than that of the lower level N1, so as to clear at the upper surface thereof a platform 32. The presence of maintenance hatches 33 and 34 which open at the upper surface of the highest level is also noted. These maintenance hatches will be closed in use by panels not represented.

The presence of a crane support 37a is also noted. For indication only, such a module 3 may have the following dimensions:

length: 29.5 meters;
width (excluding staircases 31): 14 meters;
height: 12 meters.

As to its weight, considered while the module is arranged and equipped with all the apparatuses that make it work, it can be in the order of 1000 tons.

Figure 3:
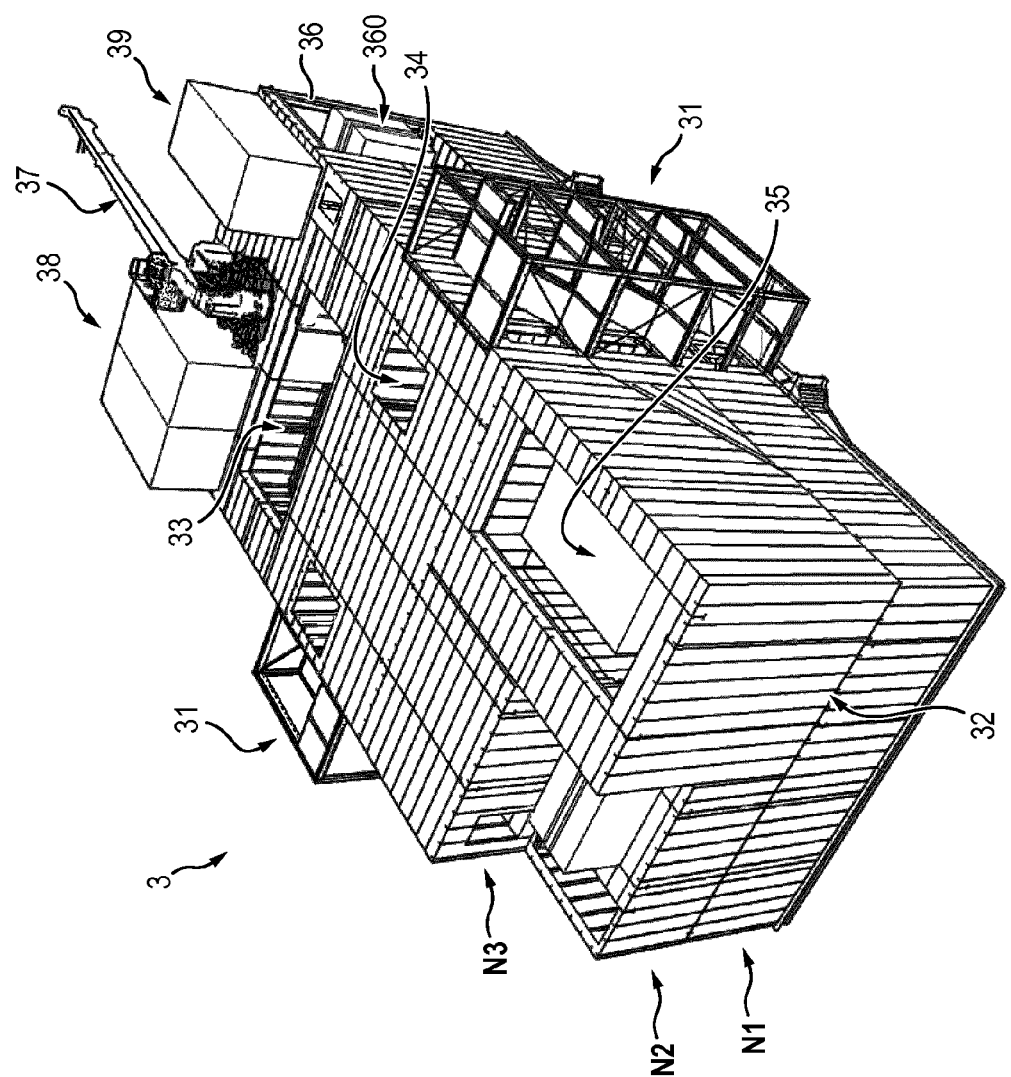
FIG. 3 is a view similar to the preceding one, the module being represented while being provided with optional additional equipment items.
Figure 4:
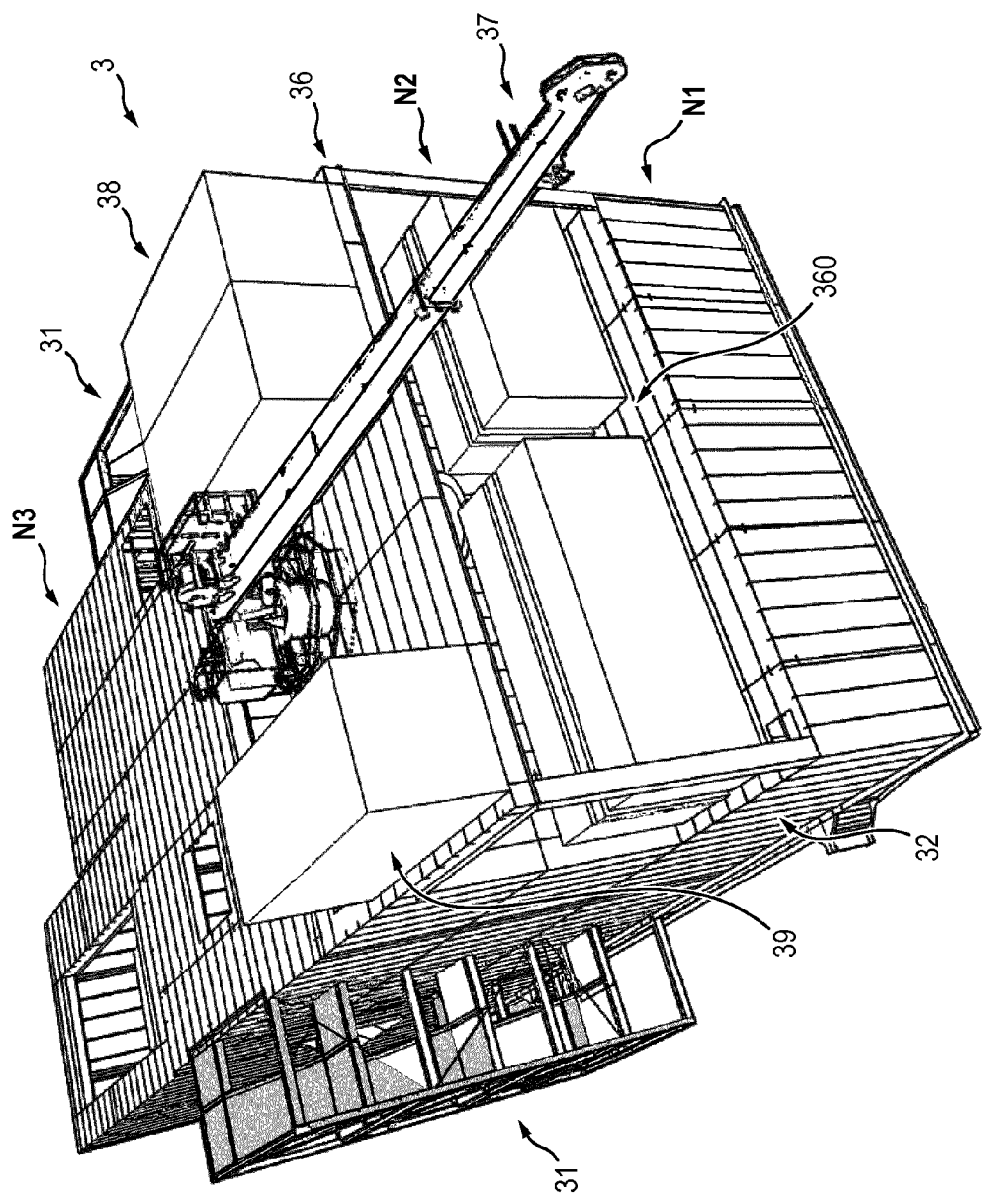
FIG. 4 is also a perspective view of the module of FIG. 3, seen along a different direction.

The module of FIGS. 3 and 4 is the same as that of FIG. 2. However, as represented here, it is equipped with optional equipment. Thus, the presence of shunt reactor 35 is noted, whose function is to control the voltage of a grid by compensating for the capacitive behavior of a grid by its inductive behavior which is placed on the aforementioned platform 32 and protected by a peripheral fence. The presence in the upper portion of a maintenance hatch which is closed in use by a panel not represented, is also noted. The presence of a radiator 360 protection roof 36 at the opposite end is also noted.

This roof 36 serves as a support for a backup electric generator 38 and a harmonics filtering system 39. The presence on the support 37a of a lifting crane 37 with a lifting capacity adapted to the needs of the sub-station, is noted. With such optional equipment items, the basic shape and dimensions of the module 3 do not change. However, and again for indication only, its weight can then amount to 1200 tons.

Figure 5:
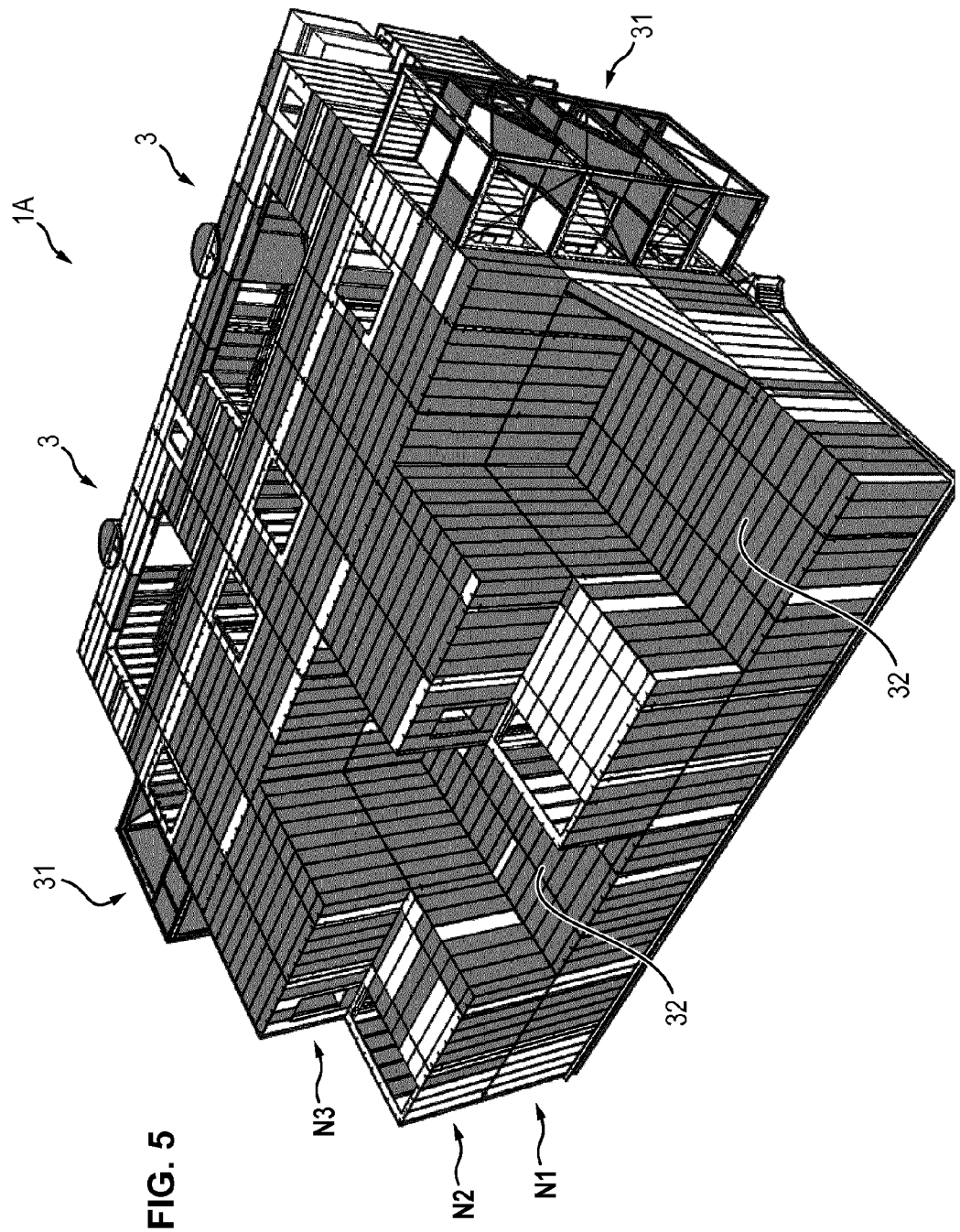
FIG. 5 is a perspective view of a sub-station including two modules such as the one represented in FIG. 2.

FIG. 5 represents one possible embodiment of an electrical sub-station 1A according to the invention. It consists here of two modules 3 such as the one of the FIG. 2. These modules are identical in the sense that they have identical shape and external dimensions, but also identical structural elements (bridges, partitions, reinforcements, etc.), both in their arrangements and in their dimensioning (nature/quality of the materials, thicknesses, modulus of inertia, etc.) necessary for the structural strength of the sub-station.

As will be seen later in the description, each module contains at least one electrical transformer configured to raise the voltage of the electricity produced by the wind farm or to lower the voltage coming from the grid and allowing to power the wind turbines during maintenance periods. According to the invention, these modules are connected to each other in order to be able to provide overall electrical power equal to the sum of the powers of each transformer. Thus, the number n of necessary modules is determined as a function of the unit (individual) power of each of the modules and of the overall electrical power desired.

In the case represented here, the two modules 3 are contiguous. In one different embodiment, the modules might not be contiguous but on the contrary separate.

Figure 6:
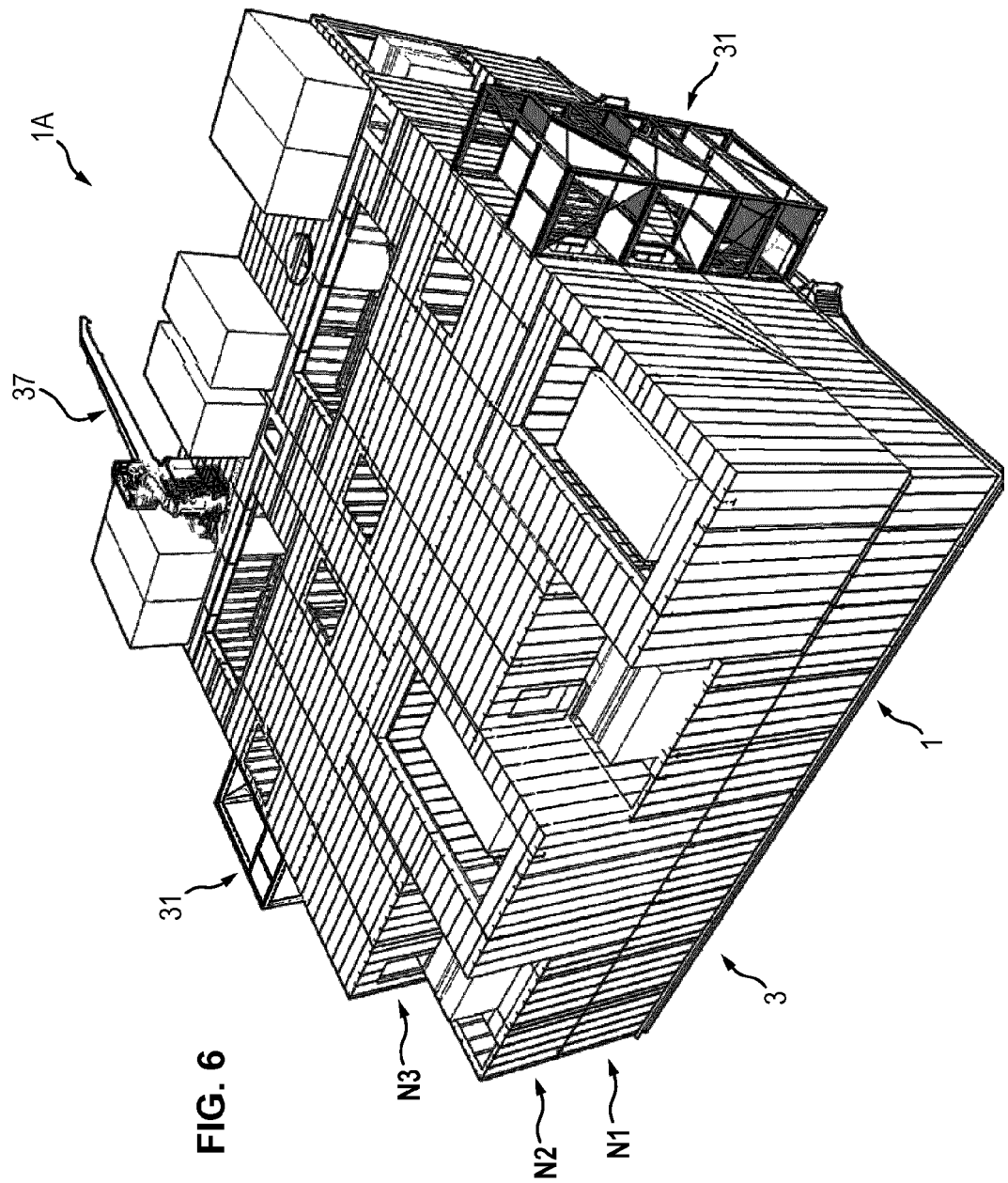
FIG. 6 is a view similar to the previous one, the modules being provided with said additional equipment items.

In a similar manner, the sub-station 1A represented in FIG. 6 consists of two modules 3 such as those of FIG. 3, i.e. with their optional equipment. The presence of a single crane 37 is however noted. But if necessary, a second crane can be provided on the module 3 which does not have one here.

Figure 7:
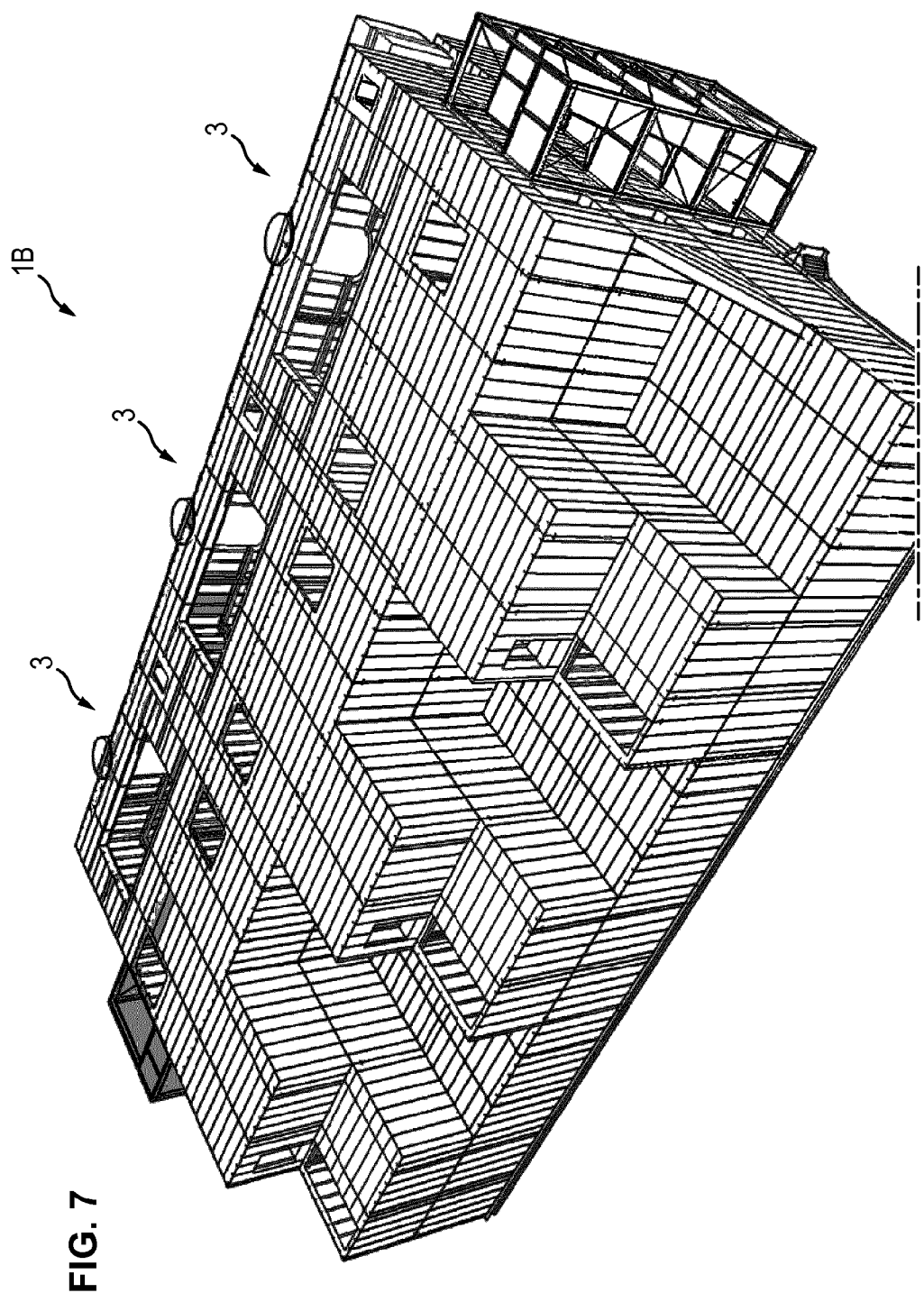
FIGS. 7 and 8 are views similar to FIGS. 5 and 6 respectively, the number of modules being here equal to three.
Figure 8:
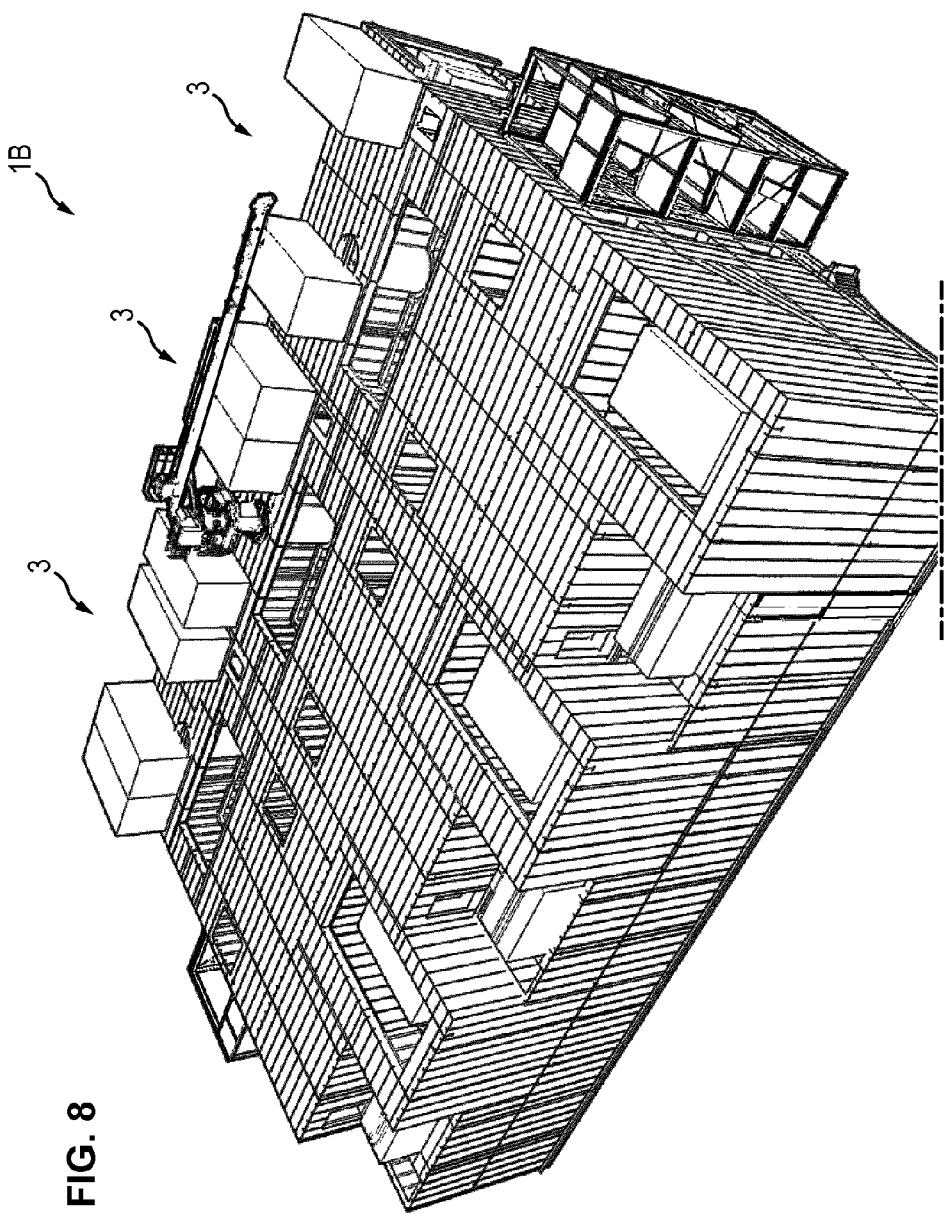

FIGS. 7 and 8 represent two similar stations 1B formed of three modules 3 identical to those described above. Of course, it is possible to consider having a greater number of modules 3, but this situation has not been represented in the figures not to clutter them unnecessarily.

Figure 9:
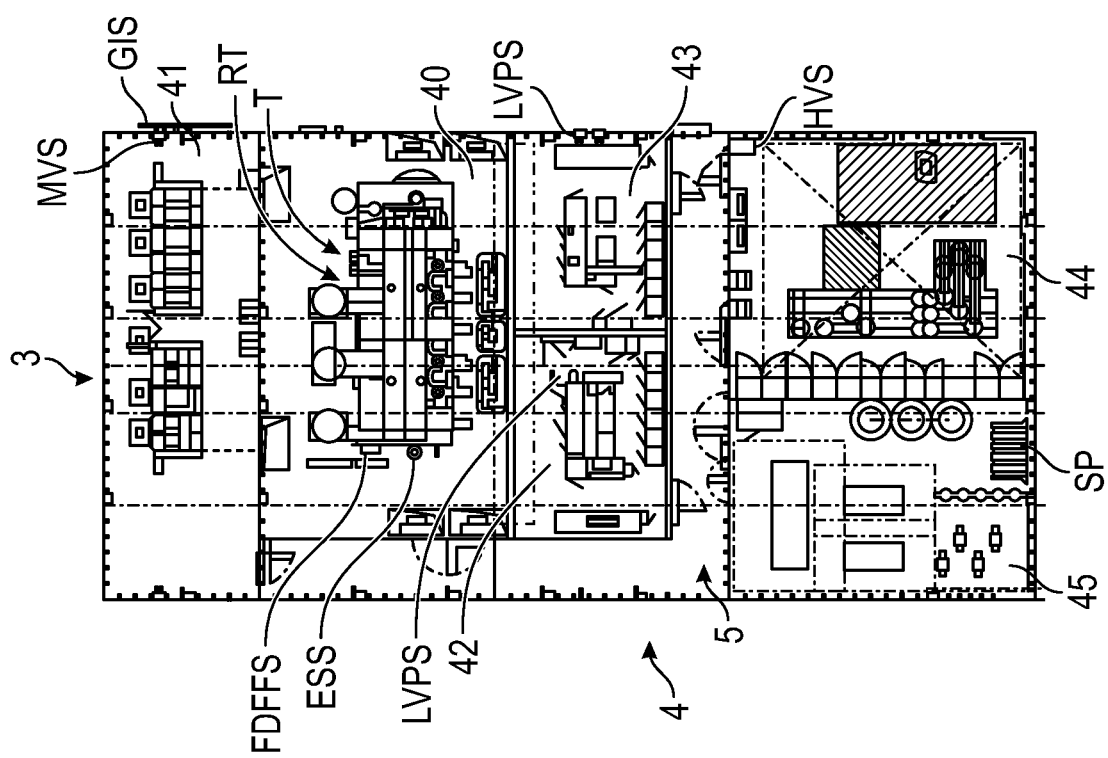
FIG. 9 is a diagram showing, seen from above, the arrangement of the rooms of a module.

FIG. 9 schematically represents the arrangement 4 of rooms of a module 3 such as the one described above. Again, this is an example so that other types of planning can be considered. Here is represented only the planning of the aforementioned level N1.

Thus, FIG. 9 deals with a set of six rooms 40 to 45 accessible by the same interior corridor 5. The fact that this corridor is placed inside the module allows the operators to circulate safely from one room to another, without having to exit the module each time. In the configuration presented, the rooms 40 to 45 have the functions detailed below.

The room 40 accommodates the aforementioned transformer T. This transformer is connected to a portion of the wind turbines of the wind farm. The room 41 accommodates a medium-voltage switchgear MVS. The room 42 accommodates the low-voltage power supply board LVPS. The room 43 accommodates a second low-voltage power supply board LVPS duplicating the first one.

The room 44 accommodates a high-voltage switchgear HVS. The room 45 constitutes premises that accommodate the fire-fighting system and the air conditioning system. The presence of the transformer T in a closed room allows significantly increasing its lifespan, compared to the known sub-stations in which the transformer, although protected, is located outside and is therefore subject to climatic hazards.

Figure 10:
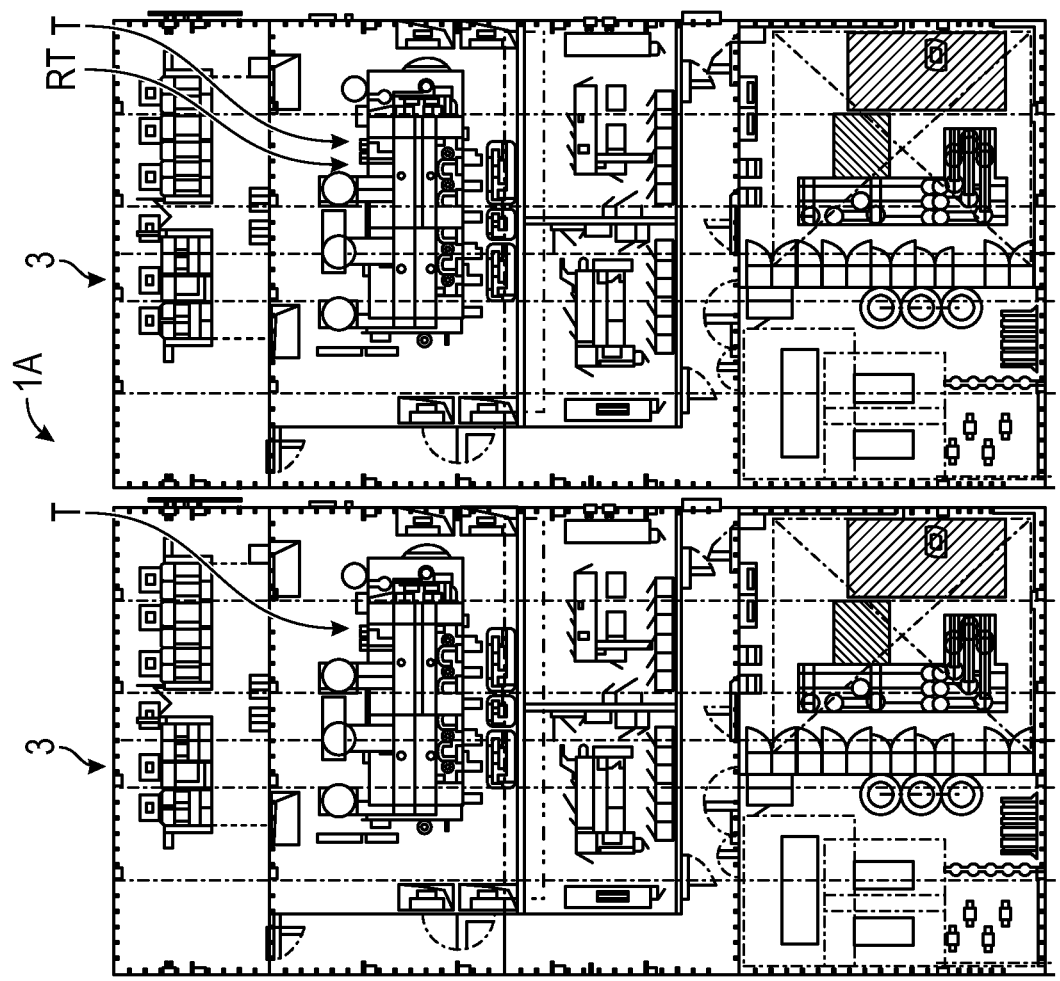

FIG. 10 schematically represents the arrangement of the rooms of a sub-station 1A consisting of two modules 3. Again, the representation is limited to the main level N1. Advantageously, this arrangement is strictly the same for both modules 3. In these circumstances, the construction of the modules 3 and the planning of their interior space can be rationalized.

In one embodiment not represented, the arrangements of the rooms of a first and a second module 3 are reversed so that, when positioned next to each other, their respective rooms are symmetrical. Thus, this configuration makes it possible, where necessary, to more easily connect rooms of the same function that belong to these two different modules.

On the other floors, the following premises can be provided:

premises for data control, supervision and acquisition;
premises for an auxiliary (i.e. backup) and grounding transformer;
premises for backup generator set;
safety shelter;
workshop;
warehouse.

Moreover, a helihoisting area and a radar mast can be provided for example on the roof of the upper level. FIG. 11 differs only from FIG. 10 by the fact that it deals with three identical modules 3.

In the sub-stations of the invention, the transformers T preferably have an identical power. However, it is possible to consider that at least one transformer has a different power than that of the other transformers. In addition, at least one of the modules may be provided with a redundant transformer RT, i.e. configured to be put into service only in case of failure of the transformer T of one of the other modules.

As already mentioned above, the sub-station of the invention is preferentially installed offshore but it can be installed onshore. Moreover, the modules 3 of the sub-station are advantageously installed on the same support, but can also be installed on at least two supports. Thus, at least one module 3 of the sub-station can be installed onshore while the other module(s) 3 is/are installed offshore.

For setting up on an offshore site a sub-station according to the invention, it is of course possible to consider making the connection between the onshore modules 3 and to transport and install all of these modules on the site. But it is also possible to consider transporting and installing each of the modules 3 individually and carrying out their connection on the site.

Advantageously, each of the modules 3 can provide a power comprised between 150 and 400 MW and even more preferably comprised between 200 MW and 300 MW, these modules, when connected together, forming a "global module" of higher power. For example, it is possible to obtain a 300 MW to 600 MW sub-station by connecting two modules, a 600 MW to 900 MW sub-station by connecting three modules, etc. Each module 3 (for example 200 MW to 300 MW module) is designed to be able to receive any electrical equipment from the range in question. This can generate punctually, for the lower portion of the range, oversizing of the structure which is largely compensated by the gains achieved over the entire process, in particular in studies, industrialization, manufacture and installation. In addition, each module 3 being previously certified, it is possible to get significantly more manufacturing time (in studies in particular) which has a major advantage for the industrial operators who systematically seek to reduce the time between the initiation of the investment and the activation of the installation, which initiates the return on investment.

Using identical modules allows developing a mass production process, which is by definition more efficient in terms of cost, quality and time than a sub-station manufacturing process constituting a single exemplary model. Since the integration of additional equipment items (specific to the environmental conditions of the wind farm or to the specific requirements of the contractor) can be provided from the design and development of the manufacture in the form of options, their integration to each module is compatible with the mass production. In terms of set-up on site, the solution according to the invention also allows adapting, in real time, to the less expensive installation means available on the market, by allowing either an onshore connection of the modules 3 (which requires the use of a heavy offshore lifting means—for example 4,000 tons—but with a short time of operation), or an offshore connection of the modules (which requires the use of a lighter lifting means, but with a longer offshore time of operation). Of course, throughout the present application including the claims, it is meant by "connection of the modules", "the modules that are connected to each other" and other equivalent expressions, an electrical connection as well as, possibly, a mechanical connection according to the disposition of the modules in the wind farm.

The invention claimed is:

1. An electrical sub-station comprising:
    a wind farm which is configured to raise or lower voltage of electricity produced by wind turbines of said wind farm in order to ensure conveyance of the electricity produced to a distribution grid;
    n sub-station modules, n being an integer at least equal to 2, said modules having identical shape and external dimensions, each of said modules include an arrangement of several rooms, each of said modules houses at least one electrical transformer configured to raise or lower said voltage, said modules are connected to each other so as to be able to provide to said grid an overall electrical power equal to a sum of powers of each of said at least one electrical transformer.

2. The electrical sub-station according to claim 1, wherein said arrangement is the same from one of said modules to another.

3. The electrical sub-station according to claim 1, wherein the arrangements of a first and a second of said modules are reversed so that, when positioned next to each other, all or part of the rooms of said modules are symmetrical.

4. The electrical sub-station according to claim 1, wherein each of said modules is also provided with at least one equipment from the following list: a high- or medium-voltage switchgear, a Gas Insulated Switchgear (GIS), a low-voltage power supply board, an energy storage system for a backup power supply, an ambient air cooling system, a fire detection and firefighting system, shelter premises.

5. The electrical sub-station according to claim 1, wherein said power of each of said at least one electrical transformer is comprised between 150 and 400 MW.

6. The electrical sub-station according to claim 1, wherein said at least one electrical transformer has an identical power.

7. The electrical sub-station according to claim 1, wherein said at least one electrical transformer has a different power from that of the other of said at least one electrical transformer.

8. The electrical sub-station according to claim 1, wherein one of said modules is provided with a redundant transformer, configured to be put into service only in case of failure of said at least one electrical transformer of one of the other modules.

9. A facility which includes a plurality of wind turbines and at least one sub-station according to claim 1, wherein said sub-station is installed onshore.

10. A facility comprising:
    a plurality of wind turbines; and
    sub-stations installed offshore;
    said sub-stations including modules having substantially identical shape and external dimensions, each of said modules include an arrangement of several rooms, each of said sub-stations including at least one electrical transformer configured to raise or lower voltage produced by said wind turbines, said sub-stations being connected to each other so as to be able to provide an overall electrical power equal to a sum of powers of each of said at least one electrical transformer.

11. The facility according to claim 10, wherein said sub-station rests on a foundation on a floating support or on a seabed.

12. The facility according to claim 11, wherein said sub-station rests on a "jacket"-type foundation or monopile.

13. The facility according to claim 10, wherein modules of said sub-station are installed on a same support or on at least two supports.

14. A facility which includes a plurality of wind turbines and at least one sub-station according to claim 1, wherein at least one module of said sub-station is installed onshore while an other of said modules is installed offshore.

15. A method for setting up, on an offshore site, a sub-station according to claim 1, wherein said modules are connected onshore and then all of said modules are transported and installed on said site.

16. A method comprising:
    setting up, on an offshore site, a sub-station of multiple sub-station modules, wherein said modules have identical shape and external dimensions and wherein each of said modules includes an arrangement of several rooms;
    each of said modules being transported and installed individually;
    a connection of said modules being carried out on said site; and
    each of said modules housing at least one electrical transformer configured to raise or lower wind turbine-voltage, said modules being connected to each other so as to be able to provide an overall electrical power equal to a sum of powers of each of said at least one electrical transformer.

* * * * *